United States Patent
Blackwood et al.

[11] 3,774,229
[45] Nov. 20, 1973

[54] RECORDER STYLUS ASSEMBLY

[75] Inventors: William R. Blackwood, Topsfield; Kenneth J. Germeshausen, Weston; Edward L. Worth, Lexington, all of Mass.

[73] Assignee: EG & G, Inc., Bedford, Conn.

[22] Filed: Oct. 19, 1972

[21] Appl. No.: 298,905

[52] U.S. Cl. .......................... 346/139 C, 346/74 ES
[51] Int. Cl. ............................................ G01d 15/06
[58] Field of Search ..................... 346/139 C, 139 R, 346/74 ES

[56] References Cited
UNITED STATES PATENTS

| 3,023,070 | 2/1962 | Benn | 346/74 ES |
| 3,328,804 | 6/1967 | Morse | 346/139 R |
| 3,346,868 | 10/1967 | Masuda | 346/74 |
| 3,626,422 | 12/1971 | Lloyd | 346/74 ES |
| 3,694,574 | 9/1972 | Gray et al. | 346/139 C X |

Primary Examiner—Joseph W. Hartary
Attorney—Ralph L. Cadwallader et al.

[57] ABSTRACT

A recorder stylus assembly having a metallic rod, the recording end of which has reduced dimensions, a tip made of a plastic material fixed upon said end of the rod, the tip and rod having planar end faces that are co-planar when first assembled and perpendicular to their respective axes. The tip and rod are made of materials such that during break-in use the tip wears slightly leaving the end face of the rod protruding about one mil beyond the end face of the tip. During subsequent operation wearing at the end faces of the tip and rod is such that the one mil protrusion is maintained.

2 Claims, 6 Drawing Figures

PATENTED NOV 20 1973　　3,774,229
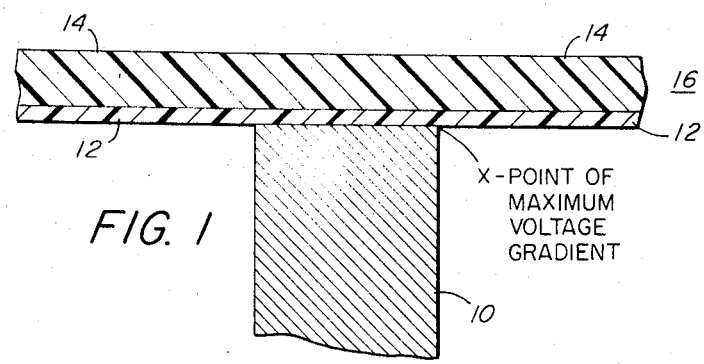
FIG. 1
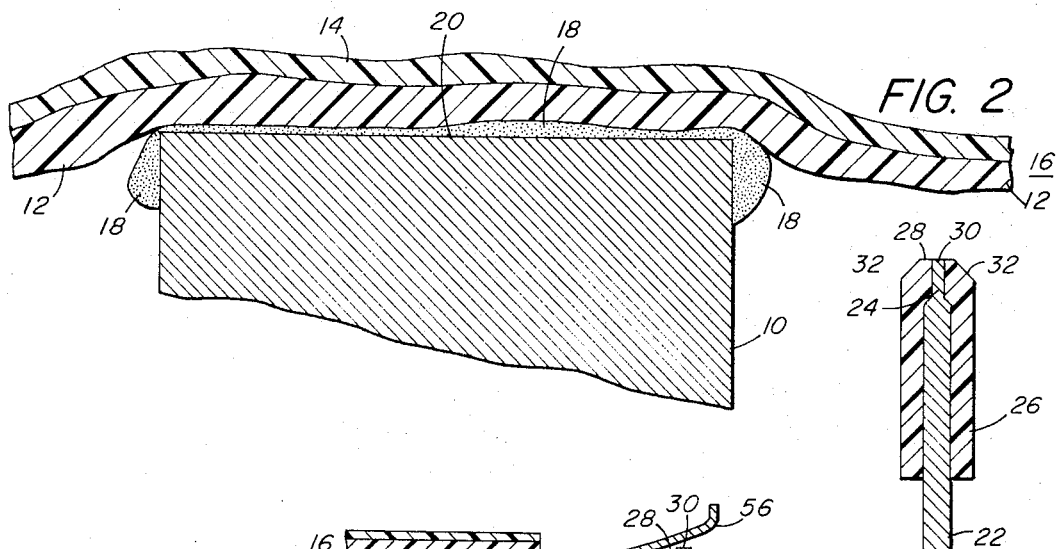
FIG. 2
FIG. 3
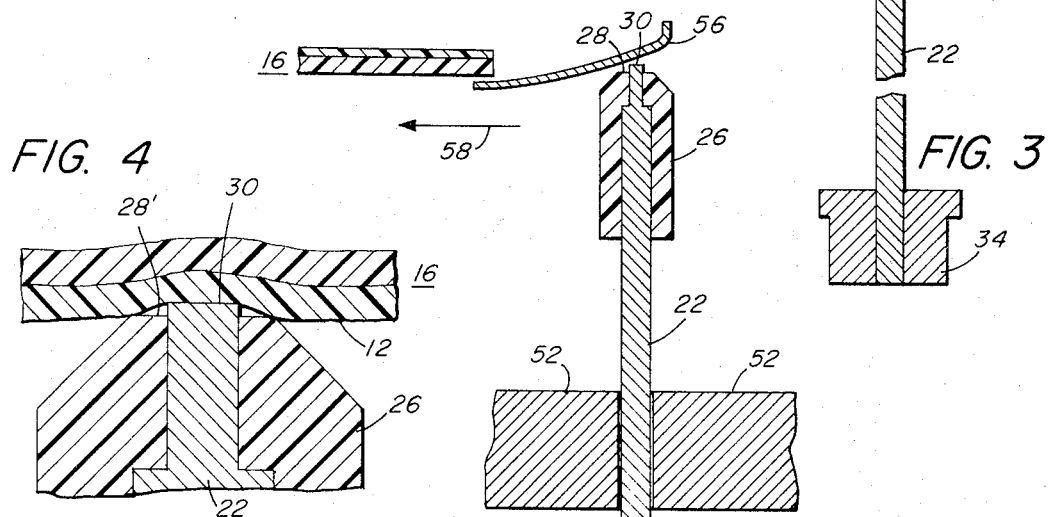
FIG. 4
FIG. 5
FIG. 6

RECORDER STYLUS ASSEMBLY

BACKGROUND OF THE INVENTION

This invention relates generally to dry process facsimile recorders for producing a hard copy of graphic data supplied in electrical line scan format and in particular to a stylus assembly for such recorders wherein one or a plurality of moving stylus assemblies are utilized to deposit image-defining electrostatic charges upon a web of paper of an electrostatic type having a conductive base coated with dielectric material.

This invention was actually reduced to practice in the course of work on a contract with the United States Air Force.

In prior art recorders utilizing one or more moving stylus assemblies wherein the moving stylus tip is caused to bear against the surface of a moving electrostatic paper, the assembly operates to deposit charge without skipping for line lengths of 4 to 6 inches and then operation becomes irregular and skips for some distance without depositing charge. It then clears and satisfactory deposition of charge again occurs for several inches. The skipping is not related to a characteristic of the surface of the paper. That satisfactory deposition of charge occurs some of the time indicates that mechanical resonance of the steel stylus is not the prime problem. Since the surface of the paper is not smooth, it is believed that the abrasion of the dielectric surface by the end face of the steel stylus creates fine particles of dielectric material that build up around the tip of the stylus and between its end face and the surface of the paper. This causes the stylus to lose its ability to "write" until, irregularly, the build-up disappears, and good "writing" starts again. Thus, it is an object of the present invention to prevent skipping, or irregular "writing" as described above.

If there is a flaw in the surface of the electrostatic paper, often the steel tipped stylus catches in the flaw and tears or breaks the paper. Conversely, in a number of instances the steel tip may snap and break off. Accordingly, a further object of the present invention is to prevent such tearing or breaking of the electrostatic paper and to reduce breakage of stylus tips.

A concomitant object of the foregoing objects is that the same line may be retraced many times with the stylus assembly of the present invention without damaging the paper and without producing undesirable build-up of dielectric dust.

Still a further object of the present invention is to avoid the need for a lifting mechanism for lifting the stylus on the electrostatic paper — the stylus assembly of the present invention slides along a simple physical ramp into contact with the surface of the paper.

SUMMARY OF THE INVENTION

The stylus assembly of the present invention consists of a metallic rod, the recording end of which has reduced dimensions and a tip made of plastic material fixed upon said end of the rod. This end of the rod and the plastic tip have planar faces that are co-planar. The tip may be rounded at its edge. During break-in use, the material of the tip wears slightly and the end face of the metallic rod then protrudes about one mil from the surface of the end face of the plastic tip. This protrusion ensures the creation of the voltage gradients necessary for deposition of charge in the recording paper. Under subsequent operating conditions, the end faces of the plastic tip and metallic rod wear at rates such that the one mil protrusion of the end face of the metallic rod beyond the end face of the plastic tip is maintained. Stated differently, the plastic tip acts as a depth limiter, preventing catastrophic tearing of the dielectric surface of the paper by the metallic rod.

The foregoing and other features and details of the invention will be more clearly understood by reference to the following description of the preferred embodiment, having reference to the appended drawings.

BRIEF DESCRIPTION OF THE DRAWING

FIG. 1 illustrates in section a prior art stylus tip in contact with the dielectric surface of an electrostatic recording paper;

FIG. 2 is an enlarged sectional view illustrating the build-up of dielectric powder around the tip of a steel stylus and between the surface of the paper and the end face of the stylus;

FIG. 3 is a sectional view of one embodiment of the stylus assembly of the present invention;

FIG. 4 is a sectional view illustrating the stylus assembly of the present invention after break-in wear thereof;

FIG. 5 is a view partially in section illustrating another embodiment of the stylus assembly of the present invention; and FIG. 6 is a sectional view schematically illustrating means for utilizing the embodiment of FIG. 3.

FIG. 1 illustrates prior art stylus tip 10 in contact with coating 12 of dielectric material on conductive base 14 of an electrostatic recording paper 16. If the dielectric constant of dielectric material 12 is assumed to be 5, and if the thickness of dielectric material 12 is assumed to be one-half mil, then with an applied writing pulse of 700 volts, the voltage gradient at $X$ is, to a first approximation, five times the voltage gradient in dielectric material 12. Thus, with the above assumptions, the voltage gradient $g$, is:

In dielectric material 12, $g = 700/1/2 = 1,400$ volts/mil

In air at $X$, $g = 5 \times 1,400 = 7,000$ volts/mil

However, electrostatic paper 16 is not smooth and dielectric material 12 is deformed by the pressure of stylus tip 10 bearing against it. It is believed that abrasion of tip 10 against dielectric surface 12 causes build up 18 of dielectric powder, as shown in FIG. 2, around tip 10 and between end face 20 and the surface of dielectric material 12. This would drastically reduce voltage gradients and impair deposition of charge until the build-up clears.

Referring not to FIG. 3, the stylus assembly of the present invention includes a stylus 22 having an end writing portion 24 with a plastic tip, sheath or sleeve 26 surrounding it. Typical dimensions are as follows:

Stylus 22 — 0.6 inch long by 20 mils shank diameter
End Portion 24 of stylus 22 — 8 to 12 mils diameter by 30 mils length
Tip 26 — Interior dimensions provide good fit over end portion 24 and stylus 22
Tip 26 — 0.15 inch long by maximum exterior diameter of 50 mils. End face 28 has an exterior diameter of 30 mils.

Note that end faces 28 and 30 are planar and, in fact, are co-planar when first assembled before use. Edge 32 of tip, sheath or sleeve 26 may be beveled or chamfered at a 45° angle between end face 28 and the exterior radius of tip 26. This enables tip, sheath or sleeve 26 to ride easily across the uneven surface of paper 16 without tearing at flaws.

The materials from which stylus 22 and tip, sheath or sleeve 26 are made are specially selected to achieve two desirable and necessary results. First, as seen in FIG. 4, after break-in use, constituting several passes over paper 16, end face 28' of tip 26 must wear down about one mil below end face 30 of stylus 22. Second, the wear rates during subsequent use at end faces 28 and 30 must be such as to maintain the 1 mil protrusion of end face 30 beyond end face 28. This assures that the voltage gradients needed for depositing charge are maintained between end face 30 and the surface of dielectric material 12 without interference from tip 26. At the same time, end faces 28 and 30 ride smoothly and easily over the irregular surface of paper 16 without tearing at flaws and without the undesirable build-up of dielectric powder described above.

We have discovered that the following materials meet these requirements admirably:

Stylus 22 — Drill rod made of tool steel

Tip 26–A polyimide-polytetrafluroethylene resin composition as disclosed in U.S. Pat. No. 3,652,409 assigned to Dixon Corporation of Bristol, Rhode Island and manufactured and sold by that company under the trade name "Rulon J." This has excellent wear and lubrication properties. This latter property eliminates the thermal load on the dielectric surface of the paper caused by friction.

Obviously stylus 22 must be made of a metallic electrically conductive material for conducting voltage pulses to deposit charge. Further, the length of end portion 24 will be a compromise between wearing life and the ease with which it can be accidentally snapped off during handling and assembly. Thus, where stylus 22 is made of tool steel, the 30 mil length given above was the compromise selected.

FIG. 5 illustrates an embodiment in which lever arm 40 is rotatably mounted at 42 to support 44. Stylus 46 is secured in lever 40 by any of many well know means. It has end portions 48 over which tip 50 may be fixed. Note that during use, the one mill protrusion is maintained.

The combination of stylus 22 and tip 26 with metal end cap 34 may be used in an electrostatic paper recorder utilizing an assembly schematically illustrated in FIG. 6. Stylus 22 may be slidably mounted in a bore in jewel bearing 52 in line with spring 54. Spring 54 maintains end faces 28 and 30 in contact first with ramp 56 as stylus 22 moves in the direction of arrow 58 and then in contact with the surface of paper 16. Various means known in the art may be utilized for applying recording pulses through spring 54 to stylus 22.

It will be understood that while the invention has been described in detail with reference to a specific preferred exemplary embodiment, it is not limited either to its specific structure or to the magnitudes of dimensions described above in relation thereto for purposes of illustration, except to the extent required by the appended claims.

We claim:

1. In a dielectric paper recorded utilizing one or more moving styluses, a stylus assembly comprising:
    an electrically conductive rod made of tool steel;
    a plastic sheath made of a polyimide-polytetrafluoroethylene resin composition snugly fitted around one end of the rod,
    the rod and sheath having end faces disposed in one plane substantially perpendicular to the axis of the rod,
    the end face of the rod having a nominal diameter of 8 mils, and
    the end face of the sheath having a nominal outer diameter of 30 mils.

2. In a dielectric paper recorder utilizing one or more moving styluses, a stylus assembly comprising:
    an electrically conductive rod made of tool steel having
    a nominal length of 0.600 inch,
    a nominal shank diameter of 20 mils, and
    an end portion having a planar end face and a nominal diameter of 8 mils for a nominal length of 30 mils; and
    a plastic tip made of a polyimide-polytetrafluoroethylene resin composition having
    a nominal outer diameter of 50 mils,
    a nominal length of 0.15 inch,
    a beveled end with a planar end face having a nominal diameter of 30 mils, and
    an axial bore there-throgh having dimensions to provide a good fit of the tip around said end portion of said rod,
    said planar end faces of the rod and tip being disposed in one plane.

* * * * *